US012140544B2

(12) United States Patent
Chen et al.

(10) Patent No.: US 12,140,544 B2
(45) Date of Patent: Nov. 12, 2024

(54) BIOLOGICAL ANALYSIS DEVICES AND SYSTEMS

(71) Applicants: LIFE TECHNOLOGIES HOLDINGS PTE LIMITED, Singapore (SG); LIFE TECHNOLOGIES CORPORATION, Carlsbad, CA (US)

(72) Inventors: Ming Song Chen, Singapore (SG); Chee Woei Chong, Singapore (SG); Wuh Ken Loh, Singapore (SG); Wern Yuh Foo, Singapore (SG); Kuan Moon Boo, Singapore (SG); Norbert Leclerc, Heidelberg (DE); Kristina Uhlendorf, Jena (DE); Reiner Koellner, Jena (DE); Torsten Fuchs, Jena (DE); Stefan Breitfelder, Jena (DE)

(73) Assignees: Life Technologies Holdings PTE LTD, Singapore (SG); Life Technologies Corporation, Carlsbad, CA (US)

( * ) Notice: Subject to any disclaimer, the term of this patent is extended or adjusted under 35 U.S.C. 154(b) by 0 days.

(21) Appl. No.: 18/308,177

(22) Filed: Apr. 27, 2023

(65) Prior Publication Data
US 2023/0417676 A1    Dec. 28, 2023

Related U.S. Application Data

(63) Continuation of application No. 17/572,926, filed on Jan. 11, 2022, now Pat. No. 11,680,905, which is a
(Continued)

(51) Int. Cl.
*G01N 21/64* (2006.01)

(52) U.S. Cl.
CPC ..... *G01N 21/6452* (2013.01); *G01N 21/6428* (2013.01); *G01N 21/6458* (2013.01); *G01N 2021/6478* (2013.01)

(58) Field of Classification Search
CPC .......... G01N 21/6452; G01N 21/6428; G01N 21/6458; G01N 2021/6478
See application file for complete search history.

(56) References Cited

U.S. PATENT DOCUMENTS

| 8,361,784 B2 | 1/2013 | Oshida et al. |
| 11,237,108 B2 * | 2/2022 | Chen .................. G01N 21/6428 |
| | (Continued) | |

FOREIGN PATENT DOCUMENTS

| JP | 2009-517662 A | 4/2009 |
| WO | 02/06796 A2 | 1/2002 |

OTHER PUBLICATIONS

International Search Report for International Application No. PCT/US2020/038352, mailed Sep. 21, 2020, 12 pages.
(Continued)

*Primary Examiner* — David P Porta
*Assistant Examiner* — Meenakshi S Sahu
(74) *Attorney, Agent, or Firm* — BakerHostetler

(57) ABSTRACT

A biological analysis system can include an excitation module and an emission module. The excitation module can include a collimator element for receiving excitation light from the excitation light source and transmitting collimated excitation light in a first direction, and a plurality of excitation mirrors arrayed along the excitation light path, each excitation mirror disposed at an acute angle relative to the first direction and configured to reflect collimated excitation light along a second direction. The emission module can be positioned to receive excitation light transmitted along the second direction and can include a sample block comprising a plurality of sample receptacles positioned to receive a beam of collimated excitation light, and a plurality of photodetectors configured to receive emission light trans-
(Continued)

mitted from a respective sample receptacle in a direction transverse to the second direction of the excitation light path.

20 Claims, 11 Drawing Sheets

Related U.S. Application Data continuation of application No. 16/904,784, filed on Jun. 18, 2020, now Pat. No. 11,237,108.

(60) Provisional application No. 62/863,774, filed on Jun. 19, 2019.

(56) References Cited

U.S. PATENT DOCUMENTS

| | | | |
|---|---|---|---|
| 2003/0010930 A1* | 1/2003 | Thorwirth | G01N 21/6452 |
| | | | 250/458.1 |
| 2018/0202935 A1 | 7/2018 | Bahlman et al. | |
| 2022/0205915 A1* | 6/2022 | Chen | G01N 21/6452 |

OTHER PUBLICATIONS

SPECTRAmax™ Gemini XS Dual-Scanning Microplate Spectrofluorometer, Operator's Manual, Figure 1.4 and pp. 1-7 and 1-8 (2000).

\* cited by examiner

BIOLOGICAL ANALYSIS DEVICES AND SYSTEMS

CROSS-REFERENCE TO RELATED APPLICATIONS

This application is a continuation of U.S. application Ser. No. 17/572,926, filed Jan. 11, 2022 (now allowed); which is a continuation of U.S. application Ser. No. 16/904,784, filed Jun. 18, 2020 (now patented as U.S. Pat. No. 11,237,108, issued Feb. 1, 2022); which claims priority to and the benefit of U.S. Provisional Patent No. 62/863,774, filed Jun. 19, 2019. All foregoing applications are incorporated herein by reference in their entireties for any and all purposes.

FIELD OF INVENTION

The present invention relates to the analysis of biological samples. More particularly, the present application relates to apparatuses, systems, and methods for simultaneously analyzing a plurality of biological samples.

BACKGROUND

Fluorescence is the emission of light, often in the visible range, by a compound in response to its excitation by higher energy electromagnetic radiation. As excited compounds return to a normal or baseline excitation state, the excess energy is released in the form of light, typically at a less energetic wavelength than that used for excitation. In application, the emission light signals produced during fluorescence can inform the identity and/or concentration of certain compounds within a sample. A fluorometer is one example of an analytical instrument that uses excitation and emission spectra and intensities to analyze biological samples. Using a fluorometer, the presence and concentration of compounds, such as nucleic acid and some proteins, can be determined, whether outright or as part of of analysis workflows for DNA, RNA and proteins. Example applications include cloning, sequencing, transfection, qPCR, and protein assays.

In conventional fluorometers, ultraviolet excitation light is produced by an excitation light source (e.g., xenon lamp or mercury lamp) that can provide an intense and consistent source of radiation, thereby allowing saturation of the excitable compounds. The excitation light may be collimated to improve excitation efficiency and then directed toward a biological sample of interest. Fluorescent samples, or fluorescing reagents bound to non-fluorescing samples, become activated through exposure to the excitation light, causing the sample to fluoresce. This fluorescing emission light is received at a photodetector, and these measurements of the amount, intensity, and/or distribution of light can be used to identify and/or approximate concentrations of analyte within the sample.

Some fluorometers are configured to analyze a single sample at a time. The process of loading, taking measurements, and reloading samples is a time-consuming task for users needing to analyze and collect data on many samples. In such cases, users trade the portability and lower cost of single sample devices for an extremely low throughput. However, additional benefits are seen by performing single sample analysis including facilitating a reduction in excitation light pollution and noise and easier analysis of the emission light. These advantages are achieved because of the singular nature of the optical system component configuration. With only one sample being analyzed, there is only one set of optical components needed to effectively excite and then capture and analyze the emission spectra from the sample. Stray reflections of excitation light and subsequent detection mixed with the desired emission light can be minimized.

In contrast, for multi-sample devices, stray excitation light becomes more difficult to mitigate as the number of samples increases. This is because as the number of samples increases, the configuration of the optical system becomes more complex thus increasing the chances of sample light paths interfering and causing cross-contamination of emission light with excitation light. This cross contamination can decrease the effectiveness of activating fluorescent reagents and can distort the amount of light received by the photodetector, thereby skewing the corresponding measured concentrations of analyte included in each sample.

There are inherent difficulties implementing multi-sample devices. The most common commercial multi-sample format is the multiwell plate. Commercially available well plates typically have a standard geometric shape and size so they can be used across platforms (e.g., standard plates readers and centrifuges) without needing a bespoke machine or adaptor to facilitate use. Incidentally, the (essentially) predefined volume of the standard well plate affects the volume of sample that can be processed in each well. Conventionally, the interior volume of the plate is divided into equally sized wells spaced equally apart from nearest neighboring wells; 6-well, 12-well, 24-well, 48-well, 96-well, 384-well, and 1536-well formats are commonplace.

Because the entire volume of the plate is conventionally divided into the desired number of wells, the working volume for each well is inversely proportional to the total number of wells on the plate. For example, in a 6-well plate, the recommended working volume per well is between 3-5 mL, whereas in a 24-well plate, the recommended working volume per well is less—about 600 μL. In a similar fashion, 96-well plates have a recommended working volume of 200 μL per well, with 384-well and 1536-well plates having recommended working volumes of 80 μL and 8 μL per well, respectively.

If a user opted to forego single sample fluorometry and instead wished to conduct a multi-sample fluorometry assay, there is a dearth of multi-sample systems or formats that utilize a similarly small sample volume as with the canonical single sample fluorometry systems. Instead, the user would be forced to use a multiwell plate having a sufficiently small working volume (e.g., a 96-well plate). While multiwell plates enable the automated, serial analysis of tens to hundreds of samples, most users use only a fraction of the available sampling wells for analysis—thus rendering the high throughput as excessive. In instances where sterile equipment is desirable, commonly accepted sterile techniques require the partially used plate to be discarded after the assay, and the large proportion of unused wells on discarded plates translates to increased operating costs.

Furthermore, although multiwell plates can be analyzed using commercially available fluorometers configured to accept and process these types of multi-sample plates, these systems are generally bulkier and more expensive than single sample fluorometers. Single sample fluorometers are also typically much smaller than their multiwell plate reading counterparts, which can be several cubic feet in volume. Where bench space in most laboratories is often limited, the footprint of experimental equipment is an important factor. Accordingly, a smaller multi-sample fluorometer is needed that can analyze multiple small volume samples without requiring specialized disposables (tubes, plates, etc.).

Accordingly, there are a number of problems and disadvantages in the field of analyzing biological samples with optical systems. A need, therefore, exists to provide a biological analysis device, such as a fluorometer, that can address at least some of the above problems.

BRIEF SUMMARY

Various embodiments disclosed herein are related to apparatuses, methods, and systems for an optical system configured for biological analysis. Such embodiments beneficially improve optical systems, particularly in optical systems used in fluorometry devices, for example, by enabling efficient multi-sample analysis.

A first aspect provides for a biological analysis system that includes (i) an excitation module and (ii) an emission module. The excitation module includes a collimator element configured to receive excitation light from at least one excitation light source and to transmit collimated excitation light along an excitation light path in a first direction, and a plurality of excitation mirrors arrayed along the excitation light path, wherein each excitation mirror is disposed at an acute angle relative to the first direction and configured to reflect a respective beam of collimated excitation light along a second direction of the excitation light path. The emission module is positioned to receive excitation light transmitted along the second direction of the excitation light path, and the emission module includes a sample block and a plurality of photodetectors. The sample block includes a plurality of sample receptacles, each sample receptacle positioned to receive a respective beam of collimated excitation light transmitted along the second direction of the excitation light path, and each photodetector is configured to receive emission light transmitted in a third direction from a respective sample receptacle. In one aspect, the third direction is transverse to the second direction of the excitation light path.

In one aspect, the excitation module additionally includes a plurality of excitation lenses arrayed such that each excitation lens is positioned in the second direction of the excitation light path and is configured to focus a respective, reflected beam of collimated light into a respective focused beam of excitation light to be received at a respective sample receptacle of the emission module. In one aspect, each photodetector is oriented in the third direction toward the respective sample receptacle. In one aspect, the third direction is substantially orthogonal to the second direction of the excitation light path.

In one aspect, the emission module additionally includes a plurality of emission lenses configured to focus emission light transmitted in the third direction onto the plurality of photodetectors. In one aspect, the emission module additionally includes a plurality of emission filters corresponding to the plurality of emission lenses, the plurality of emission filters being positioned downstream of the corresponding plurality of emission lenses and configured to allow emission light to pass through the emission filter and to substantially block stray excitation light. In one aspect, the plurality of emission filters comprise dual bandpass filters. In one aspect, each emission lens comprises a curved lens.

In one aspect, the emission module further comprises a plurality of emission windows, each emission window associated with a respective sample receptacle and defining an area through which emission light is transmitted to downstream components in the third direction.

In one aspect, at least one of the plurality of excitation mirrors is independently adjustable.

In one aspect, the plurality of excitation mirrors are arrayed in a staggered, diagonal pattern formed by a first center point of a first excitation lens being offset vertically and horizontally from a second center point of a second excitation lens, and the acute angle of each excitation mirror in the staggered, diagonal pattern is between 50° and 75° relative to the first direction.

Embodiments of the present disclosure additionally include biological analysis systems having (i) an excitation module and (ii) an emission module. The excitation module includes an excitation light source configured to emit excitation light in a first direction; an excitation mirror selectively movable between a plurality of predefined positions, each predefined position forming an acute angles relative to the first direction and being configured to reflect the excitation light along a second direction; and a plurality of excitation lenses arrayed such that each excitation lens is positioned in the second direction and is configured to receive a reflected beam of excitation light directed thereto by the excitation mirror positioned in a respective predefined position. The emission module includes a plurality of sample receptacles positioned to receive focused beams of reflected excitation light from the corresponding plurality of excitation lenses, and at least one photodetector configured to receive emission light transmitted in a third direction from the plurality of sample receptacles. In one aspect, the third direction is transverse to the second direction.

In one aspect, the emission module additionally includes a plurality of emission lenses and a plurality of emission filters configured to focus and filter the emission light onto the at least one photodetector. In one aspect, the at least one photodetector includes a plurality of photodetectors, each photodetector configured to receive emission light from a respective sample receptacle, the emission light having been focused and filtered by respective emission lenses and respective emission filters before being received at each photodetector.

In one aspect, the system additionally includes a sample loading system configured to removably secure one or more sample containers within corresponding sample receptacles of the plurality of sample receptacles. In one aspect, the sample loading system includes a closing mechanism configured to exert a closing force on—and to positionally secure—the one or more sample containers within the corresponding sample receptacles.

In one aspect, the emission light comprises fluorescence radiation from one or more excited fluorescent labels.

In one aspect, the system additionally includes a plurality of emission apertures, wherein each emission aperture is associated with a respective emission lens of the plurality of emission lenses, and wherein each emission aperture is aligned in the third direction and defines an area through which emission light is received from the sample receptacle by the respective emission lens. In one aspect, a center point of the emission aperture is aligned with an optical center of the respective emission lens.

Embodiments of the present disclosure additionally include biological analysis systems having (i) at least two excitation light sources emitting different excitation wavelengths; (ii) a collimator element configured to receive excitation light from the at least two excitation light sources and to transmit collimated excitation light along an excitation light path in a first direction; (iii) a plurality of excitation mirrors arrayed in a staggered, diagonal pattern along the excitation light path, wherein each excitation mirror is disposed at an acute angle relative to the first direction and configured to reflect a respective beam of collimated excitation light along a second direction of the excitation light path; (iv) a plurality of excitation lenses positioned in the second direction of the excitation light path and is configured to focus respective, reflected beam of collimated light into corresponding focused beams of excitation light; (v) a sample block forming a plurality of sample receptacles, wherein the plurality of sample receptacles are positioned to receive the corresponding focused beams of excitation light; and (vi) for each respective sample receptacle, the biological analysis system includes at least the following components aligned in a third direction, which in one aspect is transverse to the second direction: (a) an emission window defining an area through which emission light is transmitted in the third direction, (b) a curved lens configured to focus the emission light passing through the emission window, (c) a dual bandpass filter for substantially blocking stray excitation light, and (d) a photodetector configured to receive the focused, filtered emission light.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
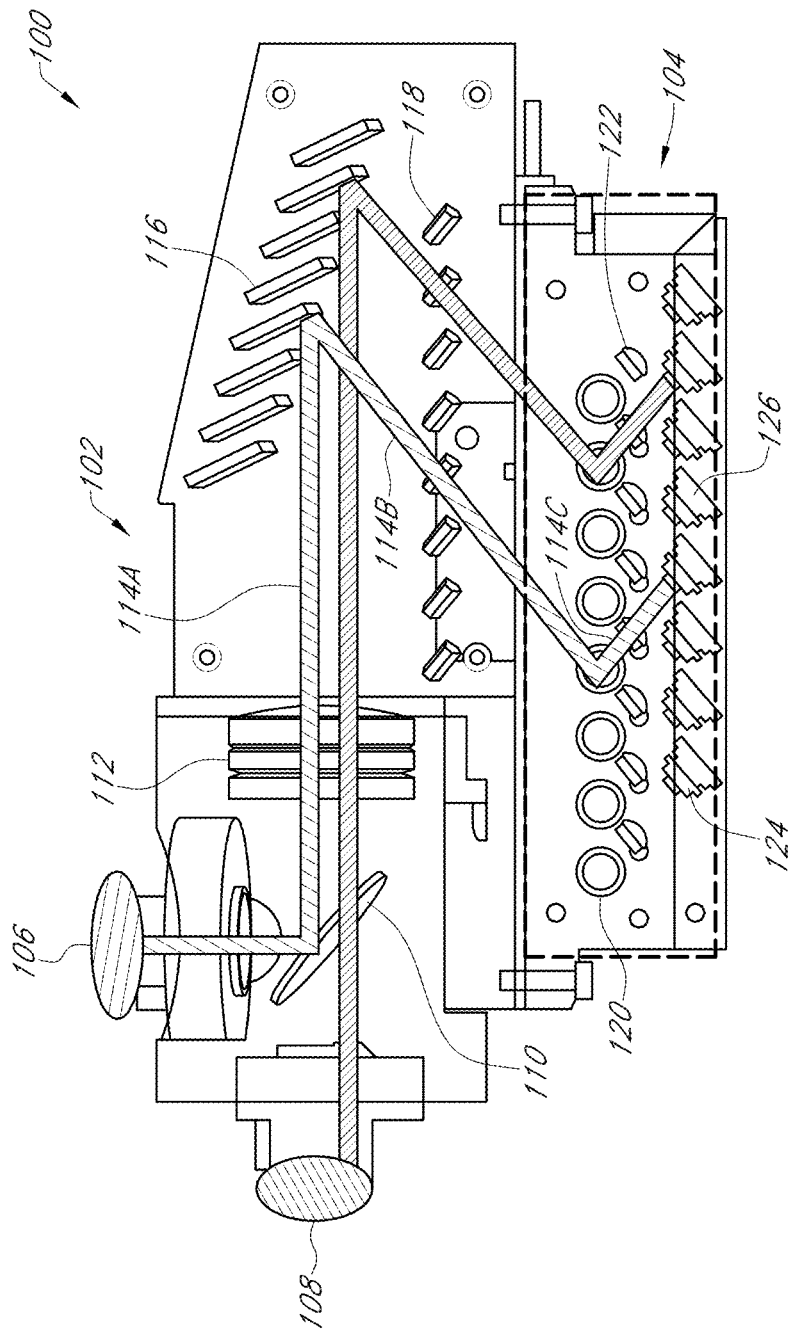
FIG. 1 shows a schematic diagram of a biological analysis device according to an example embodiment.

As used in the specification, a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. In addition, unless otherwise indicated, numbers expressing quantities, constituents, distances, or other measurements used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Furthermore, as used in the specification and appended claims, directional terms, such as "top," "bottom," "left," "right," "up," "down," "upper," "lower," "proximal," "adjacent," "distal," and the like are used herein solely to indicate relative directions and are not otherwise intended to limit the scope of the specification or claims.

As described above, single sample fluorometry devices allow for a small footprint, low disposable waste, and are usually easier to configure for precise, accurate measurements. However, due to the low throughput, the time necessary to analyze multiple samples in sequential order becomes increasingly longer as more samples are measured. Because of this, many users opt for multiwell plate readers configured for fluorometry. However, these devices are large, expensive, produce more disposable waste, and require external mitigation (i.e., specialized plates with light impermeable well walls) to ensure accurate, precise data measurements. Further, as verified in user surveys, there is an outstanding need in the market for a fluorometer that can analyze more than one sample at a time without requiring the high volumes associated with multiwell sample plates.

The embodiments provided herein overcome one or more of the noted problems in the art and are directed to a biological analysis system for simultaneously analyzing multiple samples. For example, the system disclosed herein include a uniquely designed excitation module and corresponding emission module that significantly decreases the footprint typically associated with multi-sample fluorometers. Furthermore, components of the disclosed optical systems can be independently tunable to accommodate various and variable configurations of sample loading systems, such as a different number of sample wells or the orientation of the sample wells in relation to each other. Additionally, the disclosed systems are designed to reduce the amount of stray excitation light observed by sample sensor(s) and can prevent cross-contamination of light between samples—all while maintaining a small footprint and without requiring specialized disposable products. Indeed, the disclosed systems can receive and analyze biological samples using the same sample containers as conventional single sample fluorometers (e.g., 500 μL thin-walled polypropylene tubes).

FIG. 1 shows a schematic diagram of a biological analysis system 100 according to an exemplary embodiment. The biological analysis system 100 of FIG. 1 is depicted as a fluorometer having an optical system that includes an excitation module 102 and an emission module 104. The excitation module 102 excites one or more samples (or fluorescent tags within samples) to generate emission light, and the emission module 104 detects the emission light for analysis.

The excitation module 102 includes one or more excitation light sources (e.g., LED 106 and/or LED 108), a beam splitter 110 configured to direct one or more beams of excitation light generated by the light source(s) in a first direction (e.g., direction 114A) a collimator element 112, a plurality of excitation mirrors 116 configured to direct one or more beams of excitation light in a second direction (e.g., direction 114B) toward a plurality of excitation lenses 118 and a plurality of sample receptacles 120 configured to receive sample containers whose excited contents produce emission radiation in a third direction (e.g., direction 114C) toward a plurality of emission lenses 122, a plurality of emission filters 124, and a plurality of photodetectors 126.

The excitation module 102 can utilize a plurality of excitation light sources, such as the blue light emitting diode (LED) 106 and red LED 108 illustrated in FIG. 1, but it will be appreciated that other types or number of excitation light sources, including various excitation wavelengths, may be used. Additional, or alternative excitation light sources include, for example, lasers or mercury/xenon arc lamps. The excitation light source can include be selected based on wavelength ranges associated with violet, green, yellow, or orange visible light spectra, and/or non-visible light ranges, such as ultraviolet, near infrared, or infrared lights. In some embodiments, one or more excitation light sources used in the excitation module is selected based on the anticipated identity of analyte to be analyzed within a biological sample.

In some embodiments, the excitation light sources (e.g., LED 106, 108) are specifically tuned to the excitation wavelengths of pre-determined fluorophores. In the illustrated example of FIG. 1, the wavelengths of excitation light produced by the blue LED 106 and the red LED 108, respectively, are selected based on the excitation wavelength of known fluorophores to be used in the analysis of biological samples. Alternatively, a high intensity light source, such as a xenon/mercury arc lamp can be used be used as an excitation light source. Such lamps generate both ultraviolet (UV) light and visible light, making their implementation more practical for non-specific analyses where the exact excitation wavelength or range of wavelengths is unknown. A light source producing a single excitation wavelength or known range of excitation wavelengths can beneficially target a known fluorophore and thereby prevent or reduce inadvertent excitation of non-targeted molecules within the sample. In some embodiments, an excitation filter (e.g., a bandpass filter) can be disposed in front of the excitation light source narrow the wavelength range of the excitation light, as desired.

As shown in FIG. 1, a beam splitter 110 is used to direct the two beams of excitation light from LEDs 106, 108 along the same light path (e.g., direction 114A), thereby reducing the number of components and space used by the excitation module 102. Alternatively, an optical fiber beam combiner, or the like, may be used in place of the beam splitter 110. This illustrated configuration is highly beneficial because the excitation module size is reduced, making the overall footprint of the corresponding biological analysis device to also be reduced. Furthermore, the ability to include one or more excitation light sources allows for increased versatility and bespoke configurations of the system for analyzing different samples and/or various types of fluorophores, which may correspond to different ranges of excitation light.

The excitation light, after passing the beam splitter 110, is collimated through a collimator element 112 (e.g., a collimator lens or a concave/parabolic mirror). The collimated beam of excitation light is transmitted along a first direction 114A toward a plurality of excitation mirrors 116. The first direction 114A is generally parallel to the optical axis of the collimator element 112. The excitation light is reflected from the mirrors 116 in the form of a plurality of separate, reflected beams toward a corresponding plurality of excitation lenses 118. Each excitation lens 118 focuses a corresponding reflected beam of excitation light, generating focused beams (e.g. line-focal beams) to illuminate the samples received within the sample receptacles 120 of the emission module 104. The fluorophore(s) within each sample are excited by the focused beams of excitation light and generate emission light.

As shown in FIG. 1, the separate, reflected beams of excitation light are reflected from each corresponding excitation mirror and travel in a second direction (e.g., direction 114B). In some embodiments, the second direction is non-perpendicular relative to the first direction and forms an acute angle with the first direction, thereby causing the reflected beams of excitation light to travel in a direction back toward the collimator element 112. In contrast, some conventional fluorometer optical systems are configured to direct the light path downward, perpendicular to the light path, thus increasing the length of the overall optical system as compared to that provided by the illustrated staggered mirror configuration. Additionally, some conventional fluorometer optical systems do not include reflection excitation mirrors allowing the collimated light to continue on its initial trajectory before passing through any filters and reaching the targeted samples. Such embodiments result in a much larger system than that illustrated in FIG. 1. Therefore, the staggered mirror configuration as shown and described in FIG. 1 beneficially reduces the size of the optical system.

As alluded to above, the plurality of excitation lenses 118 generate focused beams of excitation light that travel from the excitation module 102 to the emission module 104. The emission module 104 includes a series of biological sample receptacles 120 formed into a sample block. As shown, the plurality of sample receptacles 120 are arranged as a series of uniformly spaced receptacles aligned along an axis that is approximately parallel to the first direction 114A of collimated light.

Each receptacle 120 is associated with a respective emission lens 122, emission filter 124, and photodetector 126 (e.g. photodiodes, photomultiplier tubes, CCD/CMOS sensors, etc.). The emission module 104 is configured relative to the excitation module 102 such that each focused beam of excitation light generated by the excitation module 102 travels to—and excites the contents of—a single sample container arranged within a sample receptacle 120 of the emission module 104.

Emission light (e.g., emission radiation, fluorescence radiation) emitted by fluorescing labels or molecules within samples housed in receptacles 120 is collected by individual emission lenses of the plurality of emission lenses 122, ensuring that cross-contamination of emission light from adjacent or multiple samples is prevented or minimized by focusing the emission light along the third direction 114C toward respective photodetectors. The focused emission light then passes through a respective emission filter of the plurality of emission filters 124 to be subsequently detected by respective photodetectors 126. In some embodiments, each photodetector 126 is beneficially disposed at a distance determined by a focal length of the corresponding emission lens 122, so that the emission light beam passing through the emission lens reaches the target photodetector when it is optimally focused to a line-beam. This is beneficial in case one or more of the components are misaligned slightly by ensuring that the emission light reaches at least a portion of the surface of the photodetector lens.

As facilitated by the configuration of the optical components of the excitation module 102 and emission module 104, the emission light is beneficially obtained in a different direction than the excitation light. It is desirable to obtain the emission light in a direction incident to the excitation light so as to avoid receiving direct excitation light at the emission light sensor (e.g., photodetector 126). Emission radiation is emitted in all directions from the excited sample, and most of the excitation light remains directed in the second direction 114B. By placing the emission optics in a direction transverse (e.g., orthogonal) to the second direction 114, much of the emission light can be observed in the absence of most of the excitation light. Any low-level excitation light reflected in the third direction can be filtered out by emission filters 124 (e.g., bandpass filters) before reaching the photodetector 126.

Figure 2:
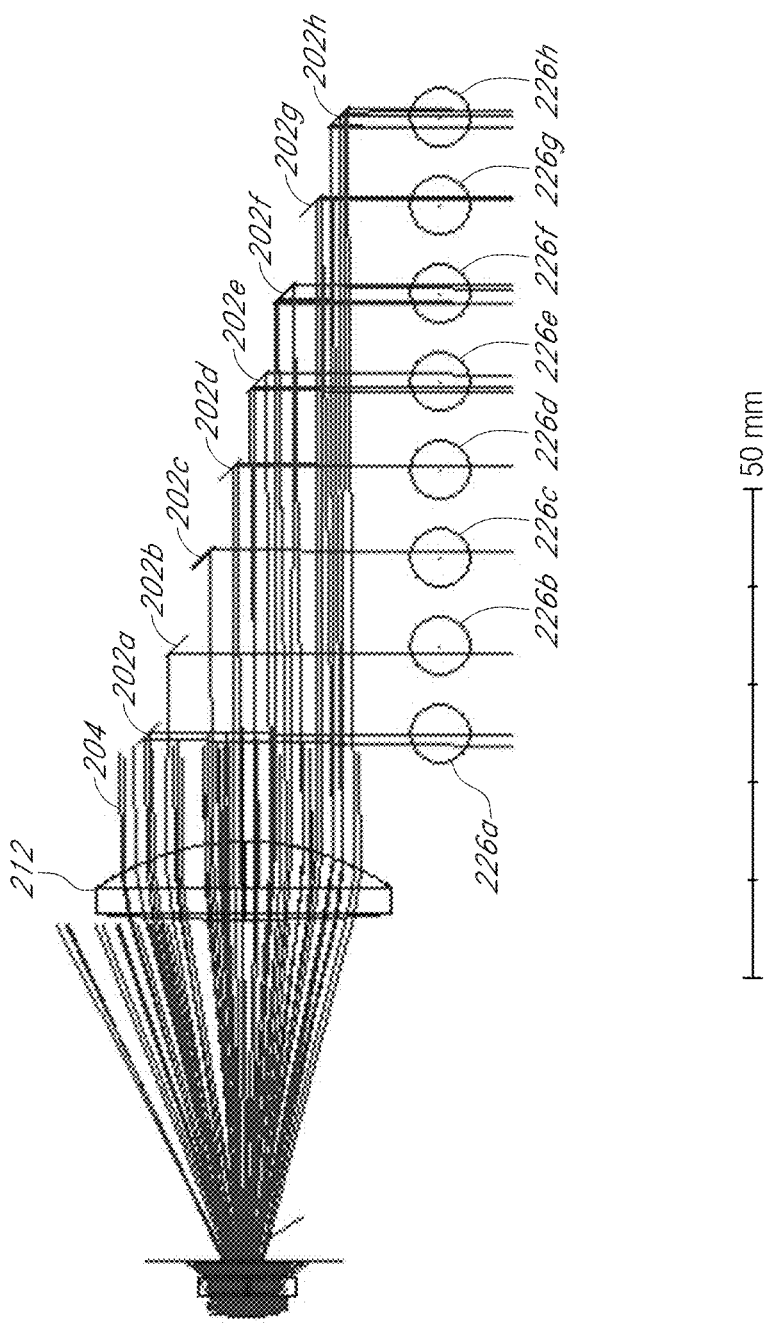
FIG. 2 shows a schematic diagram of an excitation module of the biological analysis device of FIG. 1 according to an example embodiment.
Figure 3:
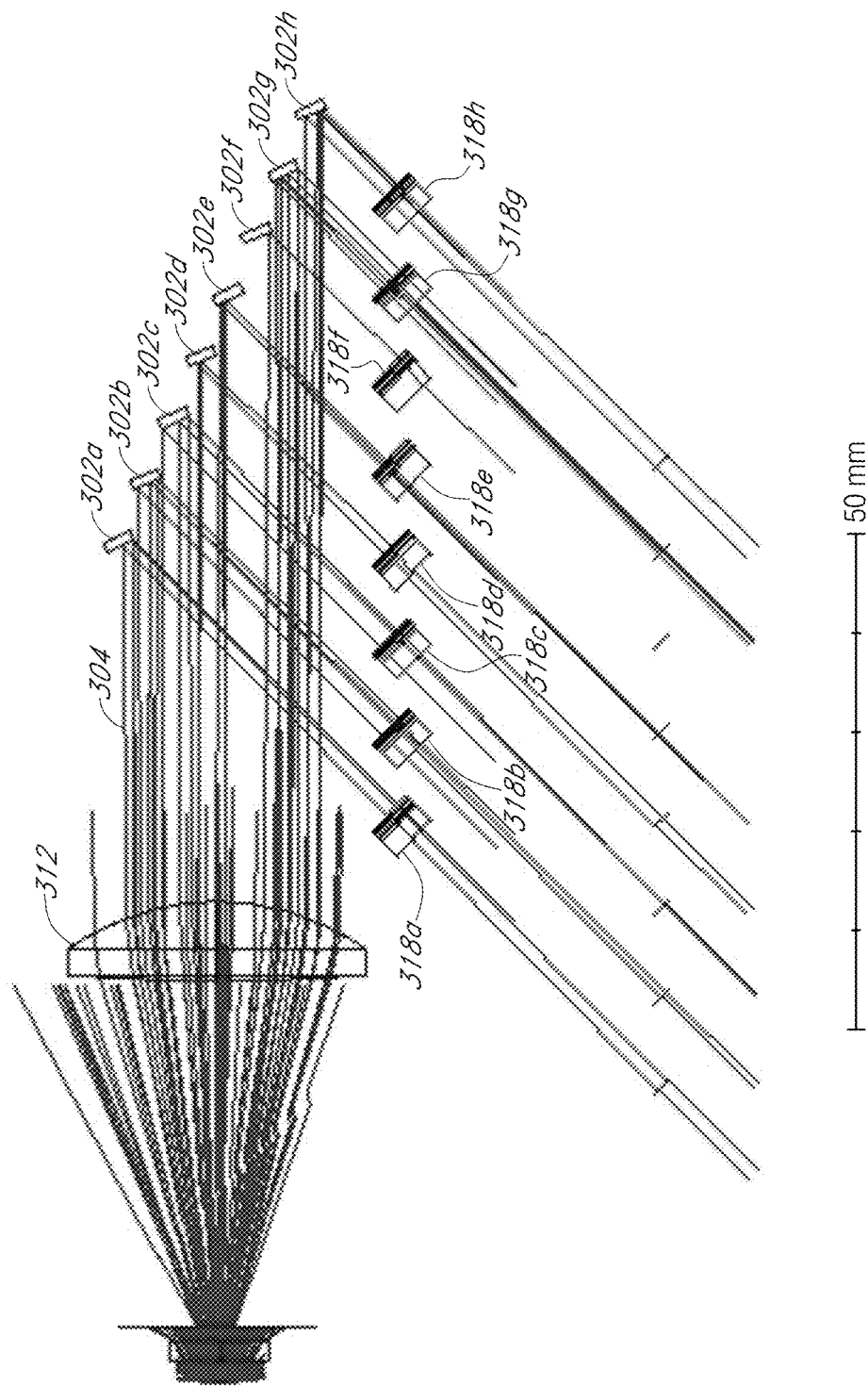
FIG. 3 shows a schematic diagram of an excitation module of the biological analysis device of FIG. 1 according to another example embodiment.

As discussed above, embodiments of the present disclosure include an excitation module 102 having a plurality of excitation mirrors 116 that reflect collimated excitation light at an acute angle towards a plurality of excitation lenses 118. FIGS. 2 and 3 show various alternative embodiments of the excitation module 102 of the biological analysis system 100 of FIG. 1. In such embodiments, each of the excitation mirrors (e.g., excitation mirrors 202a-202h and/or 302a-302h) is disposed at an acute angle relative to the direction of the collimated excitation light transmitted from the collimator element 212. For example, in FIG. 2, the plurality of mirrors 202a-202h is disposed at an angle of approximately 45° relative to the direction 204 of the collimated excitation light. Accordingly, the reflected beams of excitation light in FIG. 2 are approximately perpendicular to the incident beam (i.e., the collimated excitation light). Accordingly, in such embodiments, the plurality of sample containers 226a-226h (where sample container 226a corresponds to excitation mirror 202a, sample container 226b corresponds to excitation mirror 202b, and so on) are disposed along a uniform axis at intervals that position each sample container in the path of each reflected beam of excitation light reflected from each excitation mirror.

In FIG. 3, the plurality of mirrors 302a-302h are disposed at an angle of approximately 67.5° relative to the direction 304 of the collimated excitation light (i.e. the collimated excitation light is approximately 22.5° to a direction normal to the mirrors 302a-302h). Accordingly, the reflected beams of excitation light in the embodiment of FIG. 3 are approximately 45° to the incident beam (i.e., the collimated excitation light). Thus, the reflected beams of excitation light travel in a second direction (also see, second direction 114B of FIG. 1) from the collimated excitation light, which is generally parallel to the optical axis of the collimator 312.

FIG. 3 also shows the optical system including a plurality of excitation lenses 318a-318h corresponding to the plurality of excitation mirrors 302a-302h. For example, excitation mirror 302a corresponds to excitation lens 318a, excitation mirror 302b corresponds to excitation lens 318b, and so on. As shown, each excitation lens 318a-318h is disposed at an angle such that the reflected beams of excitation light reflected from each excitation mirror 302a-302h is approximately parallel with (and aligned with) the optical axis of the excitation lenses 318a-318h.

In some embodiments, at least one of the excitation mirrors 202a-202h and 303a-302h is independently adjustable to compensate for any optical errors by the collimator or positioning errors of the light source or beam splitter. For example, mirrors 202a and 202h may be positioned at a slightly different angle compared to mirrors 202b-202g, as the beam of excitation light transmitted by the collimator may be less collimated at the outer edges compared to the center.

It should be appreciated that while each of the examples in FIGS. 2-3 depict eight excitation mirrors and eight corresponding excitation lenses, the number of mirrors and lenses may be different in alternate embodiments, depending on the design of the overall optical system and its excitation and emission components, on the number of samples to be simultaneously analyzed by the biological analysis system 100, or on other factors. For example, a similar device configured to analyze up to twenty samples simultaneously could employ twenty sets of mirrors and lenses can address the needs of user with higher sample multiplexing requirements while still providing the benefits described herein such as reducing the overall size and footprint of the device. In another example, a similar device can be configured to analyze up to twelve samples wherein the excitation module could then be adjusted by widening the collimation beam to ensure coverage of the additional samples. Alternatively, additional optics could be used to split the collimated beam into one or more sub-beams while maintaining sufficient beam intensity for the desired application.

Figure 4A:
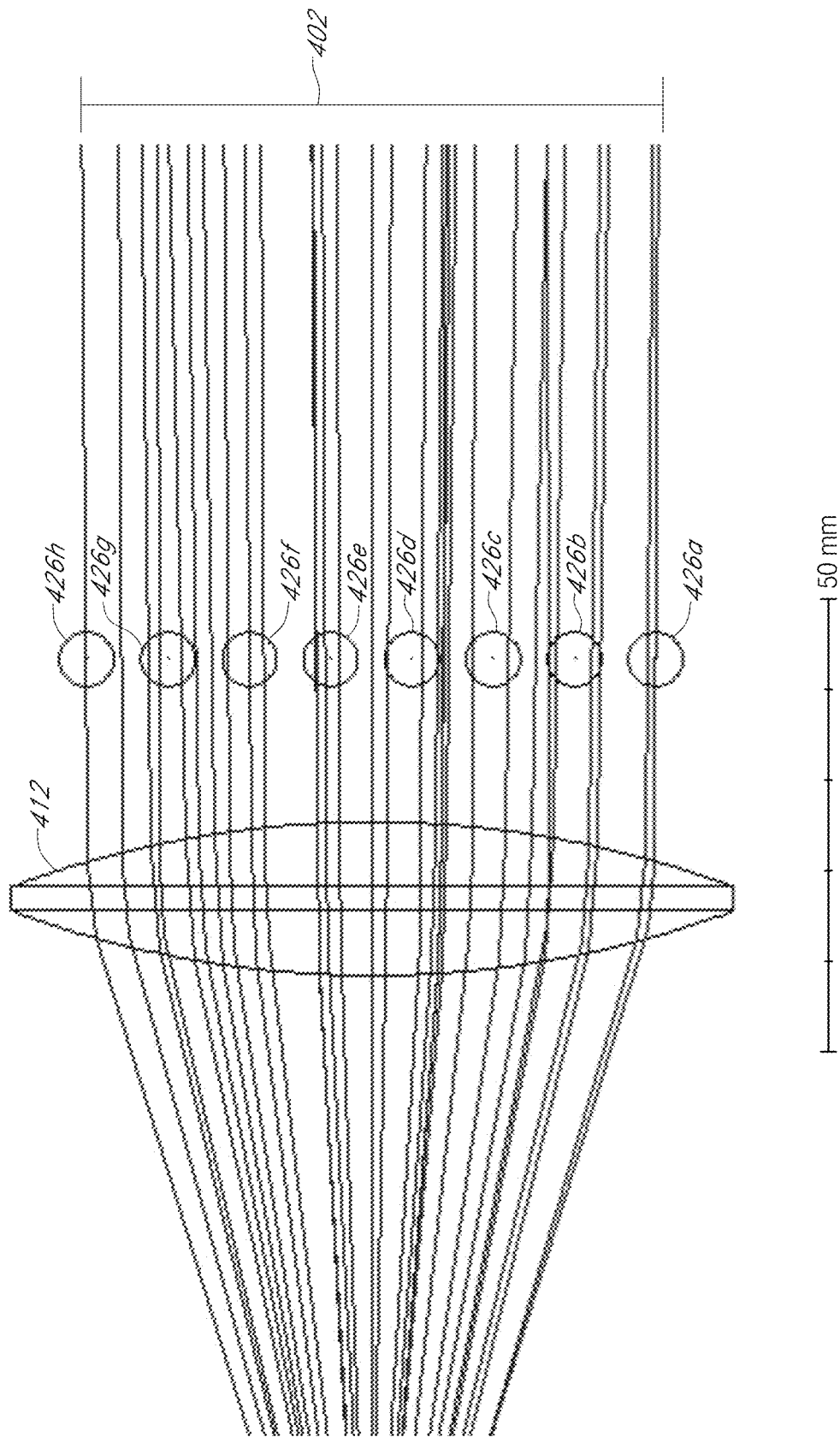
FIGS. 4A and 4B show schematic diagrams of hypothetical optical arrangements for comparison with the example embodiments.

As described above, many conventional multi-sample devices have very large footprints that are the result of the associated configuration of optical components and corresponding sample loading system. For example, referring now to FIG. 4A, when the sample containers (e.g., sample containers 426a-426h) are configured to receive microcentrifuge tubes (or similar), and the tube to tube distance (i.e., distance between adjacent samples) is 9 mm, the entire length (e.g., length 402) of the corresponding sample container strip of 8 tubes is about 70 mm. If the collimated excitation beam is to directly illuminate the strip of 8 tubes, the size (e.g., length 402) of the collimated beam needs to be larger than 70 mm. Hence the collimator and associated optics and the required space would be quite large, as illustrated in FIG. 4A.

Figure 4B:
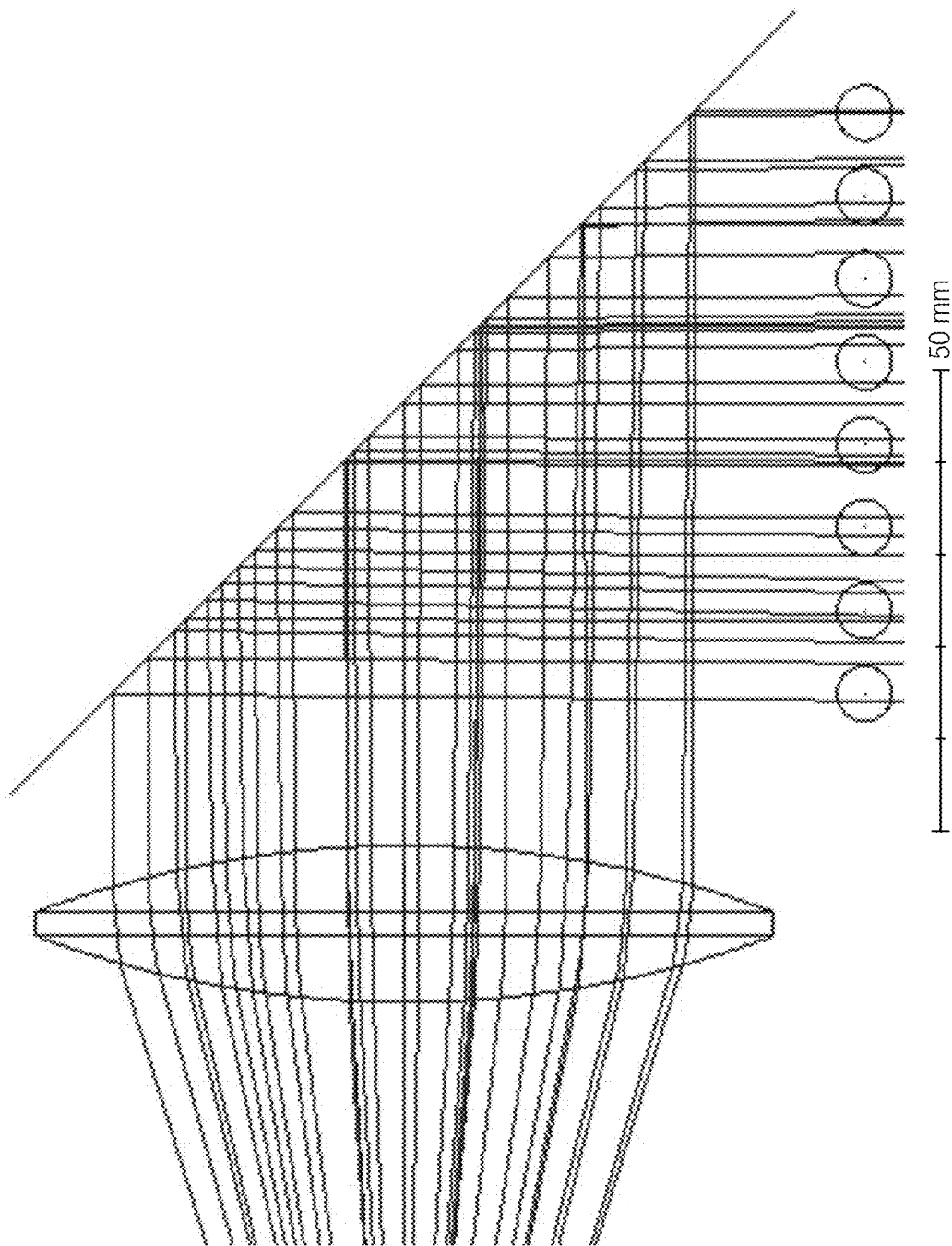

Similarly, if a single excitation mirror (or a plurality of excitation mirrors aligned along a similar axis shown by the single excitation mirror) is to be placed at an angle of 45° to the collimated beam to reflect the excitation light to the strip of 8 tubes, the collimator and associated optics and the required space would still be large, as illustrated in FIG. 4B. The increased space required is further emphasized when considering the separation of the excitation light beams and the emission radiation (i.e., the angles at which each stage of light is traveling should be non-parallel to facilitate a reduction in stray excitation light being received by a photodetector). Stray excitation light will adversely affect the ability of a photodetector to accurately detect a precise amount of emission radiation and therefore can skew the concentration calculations corresponding to a biological sample. Thus, in such instances, any subsequent optical components will be positioned accordingly, thereby increasing the width and/or length of the optical system and thus the overall biological analysis device which houses the optical system.

In contrast, the optical systems of the present disclosure utilize a plurality of individual mirrors (e.g., 8 mirrors in the non-limiting examples depicted in FIGS. 1-3) in a staggered arrangement (i.e., each mirror is laterally offset from an adjacent mirror) along a diagonal axis to fold the light path, as shown in FIGS. 2-3.

For example, with reference to FIG. 3, if the angle of the mirrors 302a-303h relative to the direction 304 of the collimated excitation light is 67.5°, the reflected beams from the mirrors 302a-302h travel downward (i.e., in a direction away from the excitation mirrors 302a-302h and toward the excitation lenses 318a-318h) and leftward (in a direction opposite to the direction of the excitation light path flowing from the collimator 312). In FIG. 3, if the vertical center-to-center distance between adjacent mirrors is 2.772 mm, and the horizontal center-to-center distance between adjacent mirrors is 6.228 mm, then the horizontal center-to-center distance of adjacent reflected beams is 9 mm, which is the tube-to-tube distance. With such an arrangement, the width of the collimated beam of excitation light will only be about 2.772 mm×8≈22.2 mm, which is much smaller than the above 70 mm. Due to "Z" layout (see light directions 114A-114C of FIG. 1), the overall optics are also compact. In one embodiment, this can allow for an overall size reduction of more than 80% compared to the arrangement illustrated in FIG. 4A.

With continued reference to FIGS. 2-3, the acute angle at which each excitation mirror is disposed can be between about 50° and 75° to form the "Z" layout. If, for example, the angle is close to 90°, the angle between the incident and reflected beams from the mirrors is close to 0°, then all mirrors will be positioned much further away from the collimator (e.g., collimators 212, 312) to ensure that the excitation lenses (e.g., excitation lenses 318a-318h) as well as the emission module can be placed outside the collimated beam. On the other hand, if the angle is close to 45°, e.g., close to the arrangement in FIG. 2, it is difficult to both accommodate the emission module in the tube strip direction because of very limited space from tube to tube while also ensuring that the angle between the direction of excitation beam and emission detection is 90° degrees to minimize the amount of excitation light in the direction of emission detection, which helps to reduce background signal and increase detection sensitivity.

The path of the excitation light from collimator element 212 to the excitation mirrors into a plurality of reflected beams follows the principles corresponding to the law of reflection. For example, the angle of incidence (i.e., the angle at which the collimated light hits an excitation light) equal the angle of reflection (i.e., the angle at which the excitation light is reflected towards the sample containers). Additionally, the angle of incidence is, in part, based on the direction of the collimated light (e.g., direction 204 and/or first direction 114A) which is fixed. When the position of a sample container is determined, the horizontal ("x") distance and vertical ("y") distance from the excitation mirror (e.g., a center point of the excitation mirror) is known. It should be appreciated that the acute angle at which the excitation mirror is disposed is equal to the angle of incidence of the collimated excitation light based from geometric principles of congruent interior angles between one or more parallel lines. Assuming that the rotation of the excitation mirror negligibly affects the known x and y distances between the excitation mirror and the sample container, the acute angle ($\theta_m$) at which to rotate the excitation mirror is approximately based on the following equation:

$$\theta_m = \frac{180° - \mathrm{ArcTan}\left(\frac{y}{x}\right)}{2}.$$

It therefore follows that the amount by which a subsequent excitation mirror corresponding to a subsequent sample container to be analyzed should be offset from the previous excitation mirror is proportional to the amount by which the subsequent sample container is offset, vertically and/or horizontally, from a previous sample container. The horizontal and vertical offsets then characterize the pattern of the staggered, diagonal configuration of the excitation mirrors.

Alternatively, because the exact angles and offsets of the mirrors can be calculated precisely, a single excitation mirror may be used—instead of the staggered array—which is able to rotate through a range of corresponding incident and reflection angles such that the direction of the reflected excitation light (i.e., second direction 114B) is directed to individual excitation lenses and/or sample receptacles serially over short intervals of time. While embodiments of the biological analysis system that include a plurality of excitation mirrors allow for each biological sample to be analyzed simultaneously, the single, movable mirror embodiments cannot simultaneously analyze each sample. However, the reduction in overall analysis time can be negligible given the small number of samples analyzed.

Figure 5:
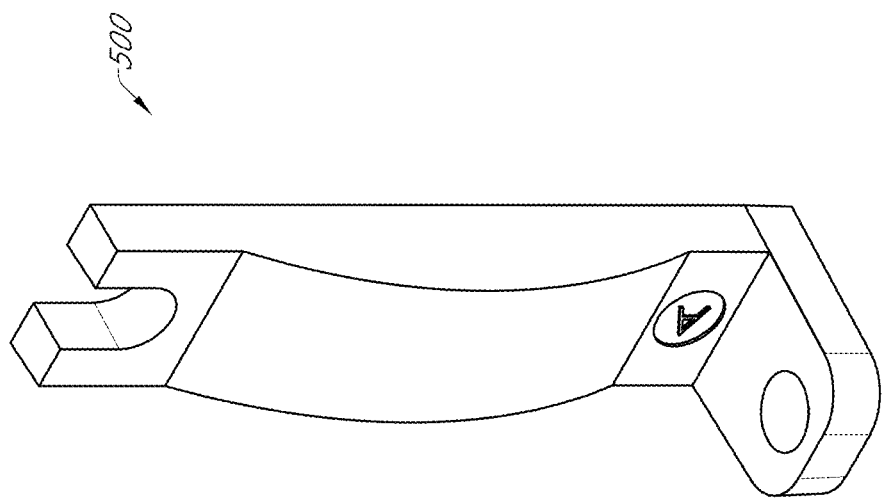
FIG. 5 shows a schematic diagram of an excitation lens according to an example embodiment.
Figure 6:
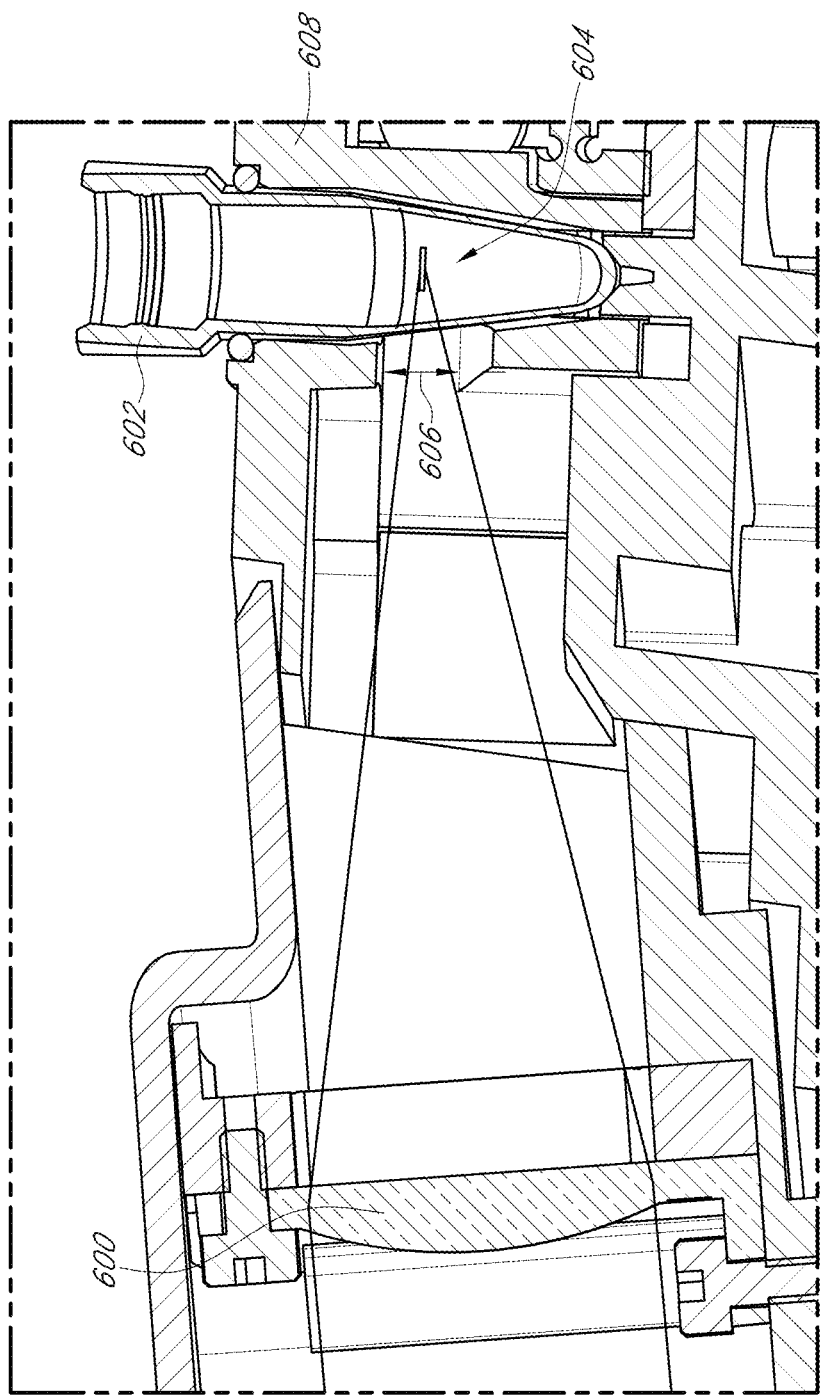
FIG. 6 shows a partial cross-sectional view of the device of FIG. 1 illustrating an operation of the excitation lens of FIG. 5.

The excitation lenses can focus a beam of excitation light of any shape into a line-focal beam. FIG. 5 shows a schematic diagram of an excitation lens 500 suitable for use as one of the excitation lenses 118 in the system 100 of FIG. 1 according to an example embodiment, and FIG. 6 shows a partial cross-sectional view of the system 100 of FIG. 1 illustrating an operation of the excitation lens 500 of FIG. 5.

In the illustrated example, the excitation lens 500 is a cylindrical lens that can substantially reduce the beam width in one direction, while maintaining the beam width in another direction. In other words, the excitation lens 500 can manipulate an incoming beam such that a focal line is produced, instead of a focal beam. Referring now to FIG. 6, for example, when the excitation lens 600 (e.g., excitation lens 500 of FIG. 1) is mounted vertically, the excitation lens 600 can focus a beam of excitation light into a horizontal line-focal beam 604, as shown in FIG. 6. Due to the line-focal beam, the interaction volume between excitation beam and liquid sample inside the sample container 602 is less sensitive to tolerance and assembly error. In other words, even if the sample container 602 is slightly offset from its normal or intended position, the line-focal beam 604 can still effectively excite the sample contained in the sample container 602. In systems capable of analyzing multiple fluorophores, such as the system 100 of FIG. 1, the focal lengths of the different excitation lenses are independently selectable, such that the focal lengths may be different from channel to channel in order to improve signal balancing across channels.

In some embodiments, as illustrated, the line-focal beam 604 passes through an excitation window 606 which facilitates a reduction in stray excitation light, for example, excitation light corresponding to one or more other excitation mirrors and/or lenses. In some instances, the excitation window is defined by an opening in a receptacle (e.g., receptacle 804 of FIG. 8). In some instances, the excitation window 606 is formed integrally with internal components of a sample loading system (e.g., sample loading system 800 of FIG. 8). In some instances, the excitation window 606 is an attachment component (e.g., an adjustable aperture diaphragm) disposed between the excitation lens 600 and the sample container 602.

After passing through the excitation window 606 and traveling in a second direction (e.g., second direction 114B of FIG. 1), the excitation light illuminates the biological sample (i.e., contents of the sample container within the respective receptacle). In some embodiments, the line-focal beam 604 of excitation light hits a barrier wall (e.g., wall 608) configured to absorb light and/or prevent stray excitation light from traveling outside the sample container 602.

Figure 7:
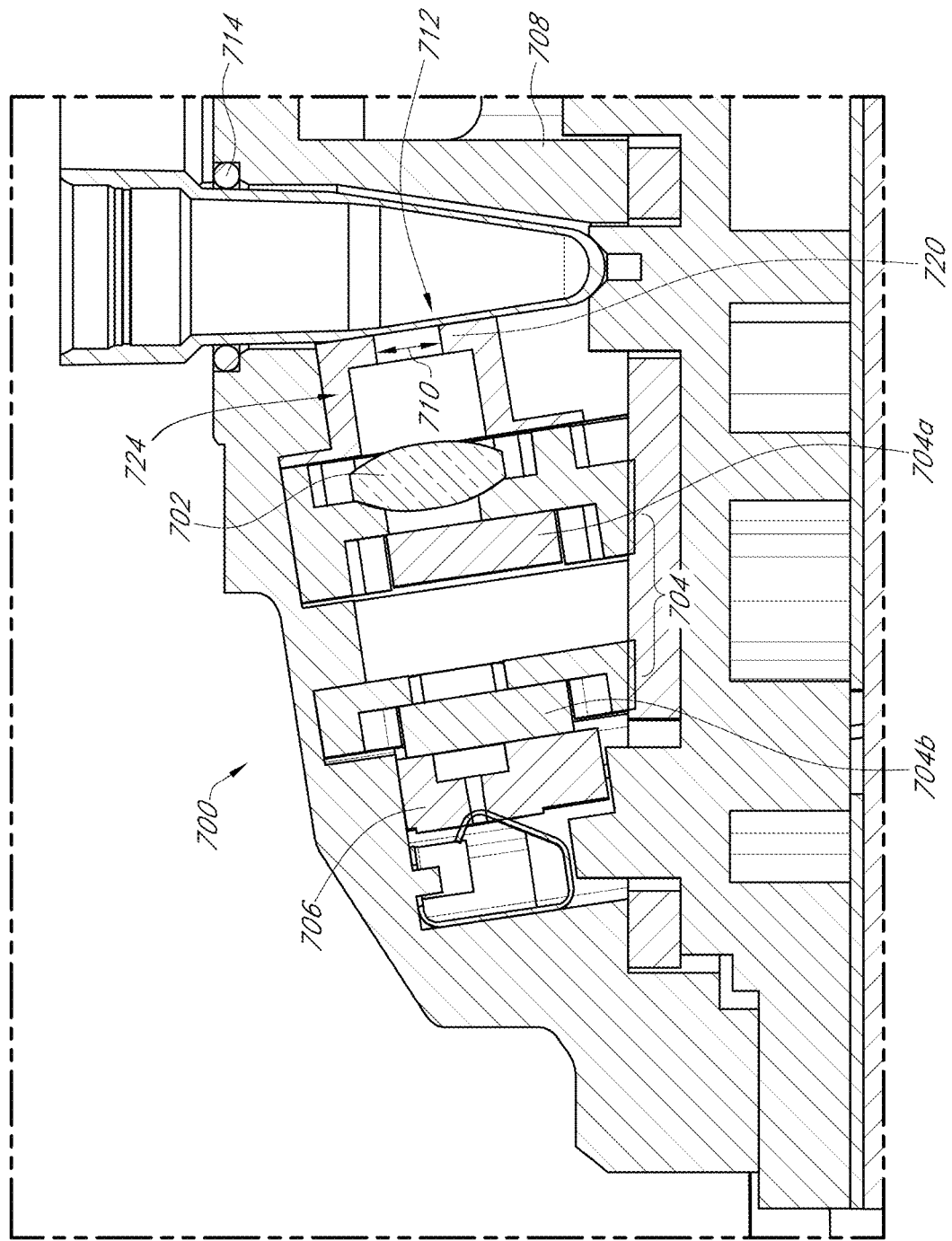
FIG. 7 shows a partial cross-sectional view of the device of FIG. 1 illustrating an emission module according to an example embodiment.

FIG. 7 shows a partial cross-sectional view of the system 100 of FIG. 1 illustrating an emission module 700 suitable for use as the emission module 104 according to an example embodiment. The emission module 700 includes multiple sets of optical elements, including: an emission window 710 formed by an emission flange 720, an emission lens 702, an emission filter 704, and a photodetector 706. Fluorescence radiation emitted by an excited fluorophore is allowed to pass through the emission window 710 and is transmitted from the sample receptacle 712 through the transparent area that is restrictively defined by the emission window 710. In some instances, the emission window 710 is defined by an opening in a receptacle (e.g., receptacle 804 of FIG. 8) configured to removably secure the sample container. In some instances, the emission window 710 is formed integrally with internal components of a sample loading system (e.g., sample loading system 800 of FIG. 8). In some instances, the emission window 710 is an attachment component (e.g., an adjustable aperture diaphragm) disposed between the emission lens 702 and the sample receptacle 712. In some embodiments, the emission module 700 does not include an emission window 710.

In some embodiments, each sample receptacle 120 is beneficially disposed at approximately a distance determined by a focal length of the corresponding excitation lens 118. Alternatively, each sample receptacle 120 is disposed such that it receives a width and/or height associated with the focused beam of excitation light, wherein the width and/or height corresponding to a width and/or height of an excitation window.

After passing through the emission window 710, the emission radiation is focused by the emission lens 702 to improve signal-to-noise ratio. The focused fluorescence radiation then passes through the emission filter 704 which can block stray light transmitted by the emission lens 702. In one implementation, the emission filter 704 is in the form of first dual bandpass filter 704a and second dual bandpass filter 704b, which are configured to block radiation corresponding to the excitation light. The use of dual bandpass filters 704a, 704b can provide blocking of light of selected wavelength ranges in a compact configuration. For example, if the excitation light is generated by red or blue LEDs, each of the dual bandpass filters 704a, 704b can block red and blue lights to minimize stray excitation light.

In some embodiments, the emission lens 702 is fitted with an emission flange 720 configured to prevent stray excitation light and/or undesired emission radiation from a non-corresponding sample container from reaching the photodetector 706. For example, as illustrated in FIG. 7, an emission flange 720 can form an emission aperture configured to define an area through which emission radiation generated by one biological sample housed in the sample receptacle 712 is allowed to pass through to reach the emission lens 702. In some instances, the emission aperture functions as the emission window 710 (i.e., there is no standalone or embedded emission window). The emission flange 720 can also include a circumferential side wall 724 configured to surround the corresponding emission lens 702, wherein the circumferential side wall extends past a thickness of the emission lens 702. The side wall 724 (or multiple side walls) of the emission flange 720 extend in the third direction (e.g., third direction 114C of FIG. 1) toward the emission filters 704a, 704b and/or the photodetector 706 and can form a channel protecting the emission lens from receiving stray light.

In some embodiments, the emission flange 720 is beneficially disposed such that the center point of the emission aperture/window is aligned with an axis line defined by the optical center of the emission lens 702 and the optical center of the photodetector 706. In some instances, the emission flange 720 is disposed at an angle wherein the outer surface of the end of the emission flange 720 forming the emission aperture is flush with an outer surface of the sample receptacle 712 and/or emission window 710. In some embodiments, the circumferential (e.g., cylindrical) side wall 724 of the emission flange 720 extends until it meets the outer circumference of the emission filter 704 and/or one or more of the dual bandpass filters (704a, 704b) of the emission filter 704 in order to create an enclosed space through which the emission radiation can travel shielded from stray excitation light and/or emission radiation from a neighboring sample container.

In some embodiments, the sample receptacle 712 is disposed such that emission radiation is limited to being transmitted through the emission window 710, wherein the emission radiation path is blocked by an emission wall 708 disposed on the opposite side of the emission window 710. In this manner, the photodetector 706 "sees" emission radiation traveling through the aforementioned openings from the sample receptacle 712. In some embodiments, the emission wall 708 is an integrated component in the emission module 700.

Figure 8:
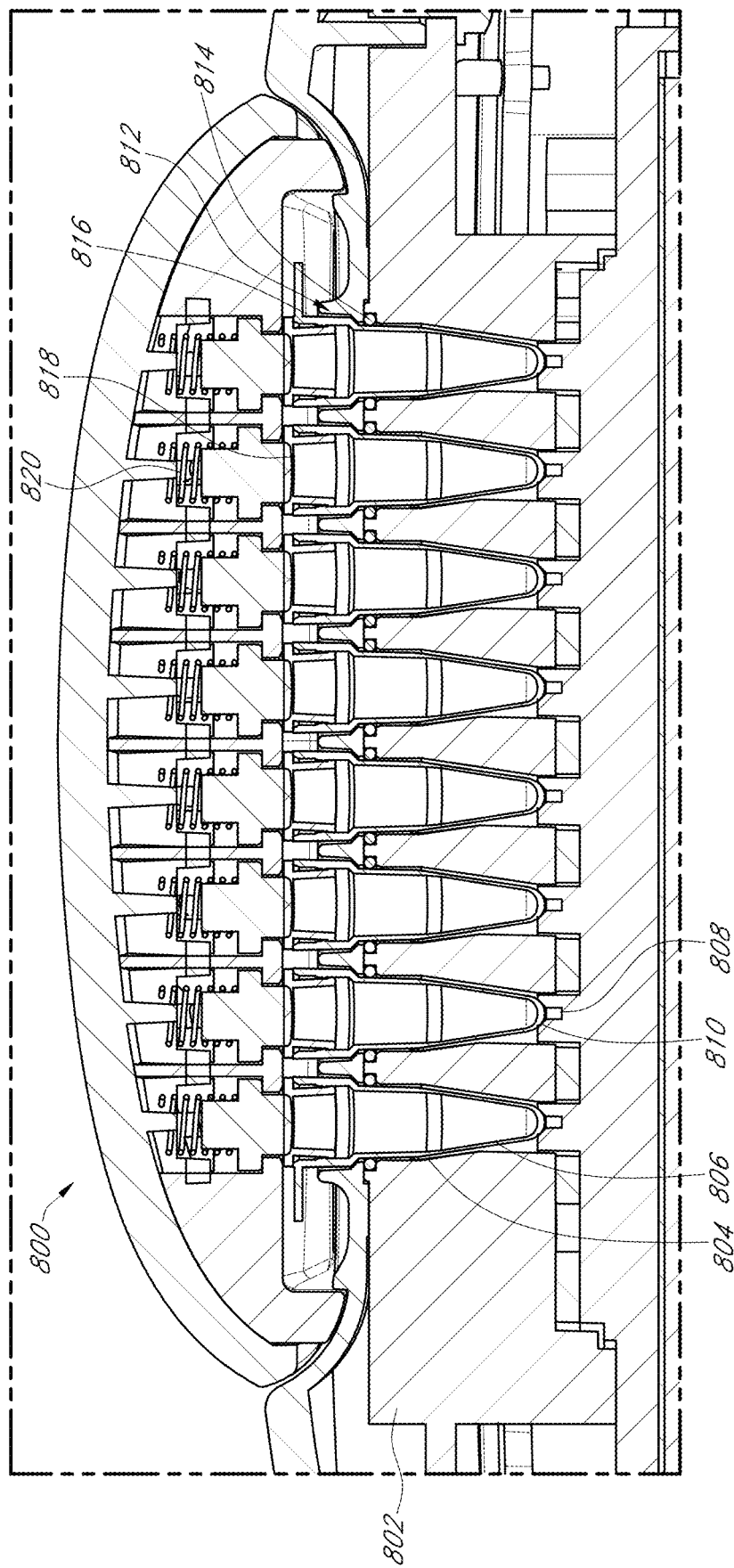
FIG. 8 shows a partial cross-sectional view of the device of FIG. 1 illustrating a sample loading system according to an example embodiment.

The biological analysis system 100 according to the example embodiments also includes a sample loading system adapted for a multiple-sample environment. FIG. 8 shows a partial cross-sectional view of an exemplary sample loading system 800 (e.g., that can be adapted for use with system 100 of FIG. 1). The sample loading system 800 includes a sample block 802 which has a plurality of receptacles 804. The receptacles 804 can receive a corresponding plurality of sample containers 806, with each sample container 806 containing a respective sample. In a non-limiting example, eight receptacles are disposed in a single straight row to receive a strip of eight sample containers. It will be appreciated that in other embodiments, the receptacles may be arranged in a different fashion, e.g. alternating or wave-like (see FIG. 9). Also, the number of receptacles may be varied depending on the number of samples to be simultaneously analyzed.

Each receptacle 804 is also designed to positionally secure the respective received sample container 806. As shown in FIG. 8, a bottom surface of each receptacle 804 includes a depression 808 which is configured to receive a bottom tip portion 810 of the respective sample container 806. In addition, a receptacle opening 812 of each receptacle 804 is fitted with a gasket 814 (which is also representative of gasket 714 of FIG. 7), which engages with a cap 818 of the respective sample container 806. Gasket 814 may comprise any suitable material, e.g., rubber, silicone. When a sample container 806 is fully inserted into the receptacle 804, the sample container 806 is effectively held in place by the depression 808 and gasket 814, with the wall of the sample container 806 not touching the wall of the receptacle 804.

The sample loading system 800 also includes a closing mechanism 816 capable of exerting a closing force on the plurality of sample containers 806. In one implementation, the closing mechanism 816 is configured to press on caps 818 of the plurality of sample containers 806. For example, the closing mechanism 816 includes a plurality of biasing members, e.g. springs 820, which can operate independently of one another. In use, if one cap 818 is not fully closed, a corresponding spring 820 can act on the cap 818 to depress it, to prevent adjacent sample containers from being positionally displaced. The springs 820 also help to further secure the sample containers 806 in the vertical direction. In an alternate implementation, the closing mechanism 816 may include sealing members configured to close the sample containers 806 when the closing mechanism 816 acts on the sample containers 806. Further, alternate forms of biasing members include bellow-like structures made of an elastic material such as rubber.

As described above with reference to FIG. 1, some embodiments of the optical system of the biological analysis system include a plurality of mirrors, uniformly spaced and uniformly angled in relation to one another. However, it is anticipated that, in some embodiments, each excitation mirror of the plurality of excitation mirrors is independently adjustable to accommodate for variable configurations and sizes of sample containers. Therefore, by adjusting one or more excitation mirrors of the optical system, the biological analysis device is able to facilitate the measurement of a diversity of sample containers to be read simultaneously.

Figure 9:
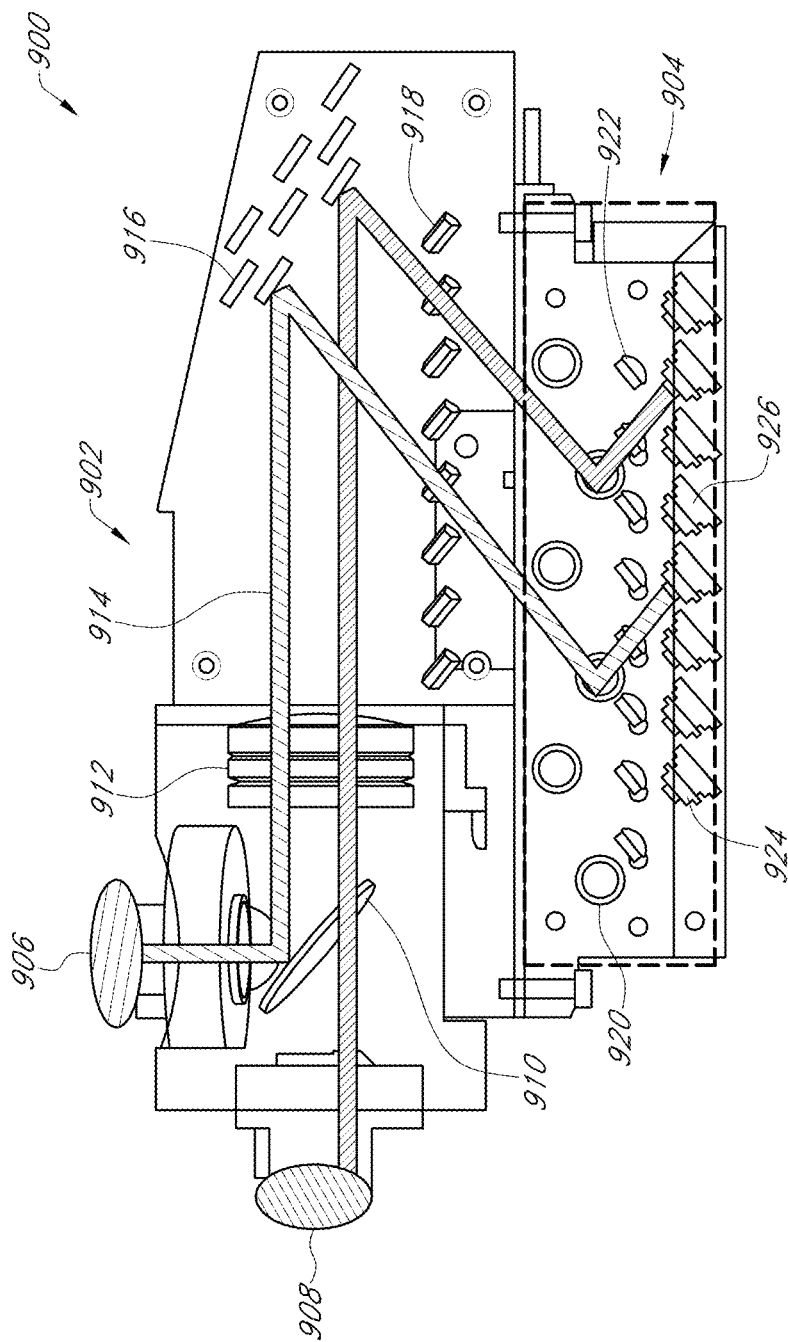
FIG. 9 shows a schematic diagram of a biological analysis device according to another example embodiment.

Referring now to FIG. 9, an example embodiment of the biological analysis system 100 of FIG. 1 is provided, wherein similar components are shown and wherein an alternate configuration of the plurality of excitation mirrors 916 and sample receptacles 920 are shown. As illustrated, the plurality of sample receptacles 920 is disposed in a staggered, alternating pattern. In some embodiments, the staggered, alternating pattern forms one or more rows of sample receptacles disposed with a vertical and/or horizontal offset from each other. Accordingly, the plurality of excitation mirrors 916 are configured such that the optical path of excitation light from the collimator element 912 reaches each of the sample containers of the plurality of sample receptacles 920 as discrete beams of focused excitation light. As illustrated, the plurality of excitation mirrors is disposed in a staggered, alternating pattern along a diagonal axis. In some embodiments, the staggered, alternating pattern forms one or more rows (i.e., excitation mirrors disposed along one or more parallel diagonal axes, the axes disposed at an acute angle to the direction of collimated light. Each excitation mirror 916 is disposed at a vertical and/or horizontal offset from one or more proximate excitation mirrors 916. It should be appreciated that the staggered pattern of the excitation mirrors of FIG. 1, FIG. 9, and/or an alternative embodiment are formed in a plurality of different configurations to accommodate variations in sample container configurations.

While FIG. 9 depicts an alternative embodiment of sample loading system and corresponding configuration of excitation mirrors, other optical system configurations are possible, including the addition or omission of certain optical components. For example, in some embodiments, the optical system may include a 1:1:1:1 ratio between the excitation mirrors, excitation lenses, emission filters, and photodetectors (e.g., FIGS. 1 and 9). In some embodiments, a single emission filter and a single detector array are used without the integration of excitation mirrors or excitation lenses. Alternatively, in some embodiments, a scanning detection head including an emission lens, an optical emissions filters, and photodetector is used to scan across the samples.

Figure 10:
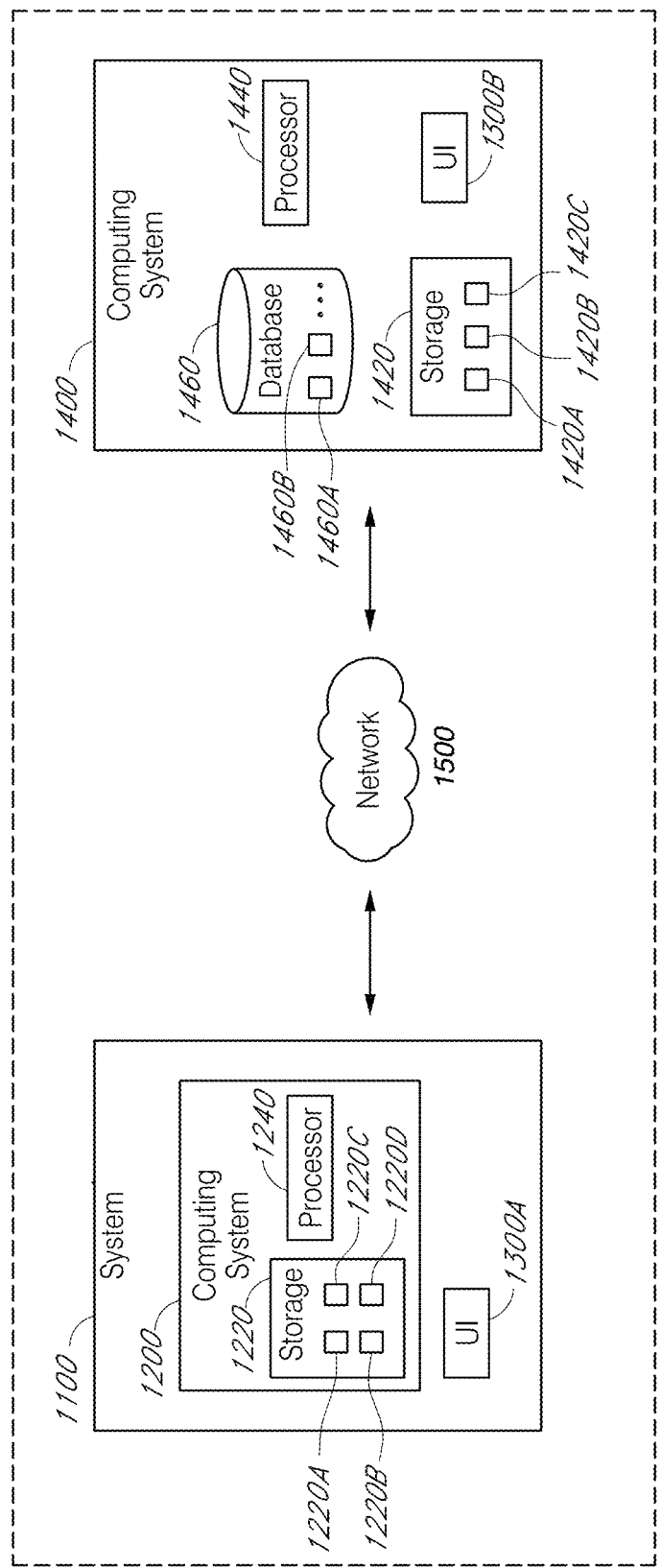
FIG. 10 shows a schematic diagram of an example computer environment including a computing system configured to implement methods corresponding to the disclosed embodiments.

As described above, disclosed embodiments directed to the biological analysis device include a novel configuration of an optical system achieving many benefits over conventional multi-sample fluorometers. In addition to an optical system and sample loading system, the device may also be configured as a computerized device. For example, referring now to FIG. 10, a computing environment 1000 incorporating a biological analysis device, for example system 100 of FIG. 1 and/or system 900 of FIG. 9, is illustrated. In some embodiments, the biological analysis system 1100 includes the optical system as described above and/or a computing system 1200. As shown, the computing system 1200 includes one or more processors 1240 and one or more hardware storage devices 1220 that store computer-executable instructions (e.g., instructions 1220A-1220D) that are executable by the one or more processors to cause the computing system 1200 to perform various acts corresponding to the disclosed embodiments herein. In some embodiments, the computing system 1200 facilitates the inclusion of a user-interface 1300a of the biological analysis system 1100.

Embodiments disclosed or envisioned herein may comprise or utilize a special purpose or general-purpose computer (e.g., computing system 1200) including computer hardware, such as, for example, one or more processors, as discussed in greater detail below. Embodiments may also include physical and other computer-readable media for carrying or storing computer-executable instructions and/or data structures. Such computer-readable media can be any available media that can be accessed by a general purpose or special purpose computer system. Computer-readable media that store computer-executable instructions (e.g., instruction 1220A-1220D) are physical storage media. Computer-readable media that carry computer-executable instructions are transmission media. Thus, by way of example, and not limitation, embodiments can comprise at least two distinctly different kinds of computer-readable media: computer storage media (e.g., hardware storage device 1220) and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" (e.g., network 1500) is defined as one or more data links that enable the transport of electronic data between computer systems and/or modules and/or other electronic devices. When information is transferred or provided over a network or another communications connection (either hardwired, wireless, or a combination of hardwired and wireless) to a computer, the computer properly views the connection as a transmission medium. Transmission media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., an "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments may be practiced in network computing environments (e.g., computing environment 1000) with many types of computer system configurations, including, personal computers, desktop computers, laptop computers, message processors, handheld devices, multi-processor systems, microprocessor-based or programmable consumer electronics, network PCs, minicomputers, mainframe computers, tablets, smart phones, routers, switches, and the like. Embodiments may be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. Program modules for one entity can be located and/or run in another entities data center or "in the cloud." In this specification and in the following claims, a computer system is also defined to include imaging systems (e.g., biological analysis system 100 of FIG. 1).

In some embodiments, the biological analysis system 1100 is in communication with a server and/or computing system 1400 via a wired, wireless, and/or cloud network 1500. For example, computing system 1400 includes one or more processors 1440 and one or more hardware storage devices 1420 storing one or more computer-executable instructions 1420A, 1420B, 1420C. Additionally, or alternatively, the computing system includes a database 146 configures to store one or more data sets (e.g., data type 1460A, 1460B). In some instances, computing system 1400 also includes a user interface 1300B. The computing environment 1000 is configured such that data (e.g., photodetector signal data and/or other data) collected by the biological analysis system 1100 is able to be stored and/or processed via computing system 1200. Additionally, or alternatively, the data from system 1100 is pushed via the network to computing system 1400, wherein the data can be stored in database 1460 and/or processed via processor 1440 and pushed back to the computing system 1200 for storage and/or further processing.

In some embodiments, the biological analysis system is configured as a "smart" device capable of automatically performing biological analysis techniques and data processing and can communicate with other computing systems to report and/or store data automatically, including raw and processed runtime information, excitation light and/or emission light wavelength and intensity, etc.

The disclosed embodiments are also directed to methods for analyzing biological samples using a biological analysis device (e.g., system 100 of FIG. 1) as described herein. In some embodiments, a computer-implemented method for analyzing a plurality of biological samples includes one or more of the following steps:

1. Detecting a plurality of sample containers (e.g., within sample receptacles 120 of FIG. 1) removably secured in a multi-sample loading apparatus (e.g., sample loading system 800 of FIG. 8).
2. In response to detecting the plurality of biological sample containers, the computing system activating an excitation light source, wherein: excitation light generated by the excitation light source is directed as a plurality of excitation light beams toward the plurality of sample containers at least by a plurality of mirrors disposed in a staggered, diagonal pattern, each mirror is configured to direct one excitation light beam of the plurality of excitation light beams toward one corresponding sample container of the plurality of sample containers, and the excitation light is configured to cause the biological samples stored in the plurality of biological sample containers to produce emission radiation.
3. Detecting an amount of emission radiation from each of the biological samples via a plurality of photodetectors.
4. Determining a concentration of one or more biological analytes includes in each of the sample containers of the plurality of sample containers, at least based in part on the amount of detected emission radiation.

In some embodiments, the computing system (e.g., computing system 1200) of the biological analysis device is configured to perform one or more of the following additional and/or alternative steps:

1. Detecting a particular arrangement of sample containers and automatically adjusting the independently adjustable excitation mirrors (e.g., excitation mirrors 116 of FIG. 1) to correspond to the detected arrangement of sample containers.
2. Determining the concentration of the one or more biological analytes based in part on the amount of detected emission radiation and based in part on one or more of the following variables: a type of assay based on the anticipated biological analyte identity associated with the one or more biological samples, a calculated calibration curve generated from data sets corresponding to a standards sample set, the amount of each sample volume stored in each sample container, assay kit lot numbers, tags, or sample identification numbers, and/or ignoring samples that have measurements determined to be out of range based on a calibration curve.
3. Displaying the determined concentrations of biological analyte via the user interface (UI) (e.g., UI 130*a*) in a numerical and/or graphical format.
4. Perform molarity and other conversions and/or calculations.
5. Automatically adjusting the aperture dimension of the excitation window (e.g., excitation window 606 of FIG. 6), emission window (e.g., emission window 710 of FIG. 7) and/or emission aperture (e.g., emission aperture 722 of FIG. 7).
6. Automatically export data (e.g., determined concentrations, analyte identities, assay identities) in various formats and/or to another computing system (e.g., computing system 1400 of FIG. 10).

In some embodiments, the user is able to input various pieces of data as described above, wherein the computing system can store and/or process the data in addition to storing and/or processing data collected by the computing system via the biological analysis device.

As described, the biological analysis systems of the present disclosure are capable of simultaneously analyzing multiple samples, while having a compact form factor. Sample loading and unloading are also simplified, while ensuring that the sample containers are securely and correctly positioned.

It will be appreciated by a person skilled in the art that numerous variations and/or modifications may be made to the present invention as shown in the specific embodiments without departing from the scope of the invention as broadly described.

The invention claimed is:

1. A biological analysis system, comprising:
   a first element configured to receive excitation light from at least one excitation light source and to communicate excitation light along an excitation light path in a first direction;
   a plurality of excitation mirrors arrayed along the excitation light path, wherein each excitation mirror is disposed at an acute angle relative to the first direction and configured to reflect a respective beam of excitation light along a second direction of the excitation light path;
   a sample block comprising a plurality of sample receptacles, each sample receptacle positioned to receive a respective beam of collimated excitation light transmitted along the second direction of the excitation light path; and
   a plurality of photodetectors, each photodetector configured to receive emission light transmitted in a third direction from a respective sample receptacle, the third direction being at an angle to the second direction of the excitation light path.

2. The biological analysis system of claim 1, wherein the third direction is transverse to the second direction of the excitation light path.

3. The biological analysis system of claim 1, wherein the first element is a collimator element.

4. The biological analysis system of claim 1, further comprising a plurality of excitation lenses arranged such that each excitation lens is positioned in the second direction of the excitation light path and is configured to focus a respective beam of light into a respective focused beam of excitation light to be received at a respective sample receptacle.

5. The biological analysis system of claim 4, wherein an excitation lens is configured to manipulate an incoming beam so as to produce a line-focal beam.

6. The biological analysis system of claim 4, wherein the plurality of excitation mirrors are arrayed in a staggered, diagonal pattern formed by a first center point of a first excitation lens being offset vertically and horizontally from a second center point of a second excitation lens, and the acute angle of each excitation mirror in the staggered, diagonal pattern is between 50° and 75° relative to the first direction.

7. The biological analysis system of claim 1, wherein each photodetector is oriented in the third direction toward the respective sample receptacle.

8. The biological analysis system of claim 1, wherein the third direction is substantially orthogonal to the second direction of the excitation light path.

9. The biological analysis system of claim 1, further comprising a plurality of emission lenses configured to focus emission light transmitted in the third direction onto the plurality of photodetectors.

10. The biological analysis system of claim 9, wherein each emission lens comprises a curved lens.

11. The biological analysis system of claim 9, further comprising a plurality of emission filters corresponding to the plurality of emission lenses, the plurality of emission filters being positioned downstream of the corresponding plurality of emission lenses and configured to allow emission light to pass through the emission filter and to substantially block stray excitation light.

12. The biological analysis system of claim 11, wherein the plurality of emission filters comprise dual bandpass filters.

13. The biological analysis system of claim 1, further comprising a plurality of emission windows, each emission window being associated with a respective sample receptacle and defining an area through which emission light is transmitted to downstream components in the third direction.

14. The biological analysis system of claim 1, wherein at least one of the plurality of excitation mirrors is independently adjustable.

15. The biological analysis system of claim 14, wherein the plurality of sample receptacles are arranged in a staggered, alternating pattern.

16. A biological analysis system, comprising:
   a first element configured to receive excitation light from at least one excitation light source and transmit the excitation light in a first direction;
   a plurality of excitation mirrors in optical communication with the first element and configured to communicate excitation light in a second direction, the second direction being at a reflex angle of greater than 270 degrees to the first direction;
   a plurality of sample receptacles, each sample receptacle being associated with a respective excitation mirror and being positioned to receive light transmitted by the respective excitation mirror along the second direction; and
   a plurality of photodetectors, each photodetector being associated with a respective sample receptacle and being configured to receive emission light transmitted in a third direction from the sample receptacle, the third direction being at a reflex angle of greater than 270 degrees to the second direction.

17. The biological analysis system of claim 16, wherein the first element is a collimator element.

18. The biological analysis system of claim 16, further comprising a plurality of excitation lenses arranged such that each excitation lens is positioned in the second direction and is configured to focus a respective beam of light into a respective focused beam of excitation light to be received at a respective sample receptacle.

19. A biological analysis system, comprising:
a light path; and
a first element configured to receive excitation light beams from at least one excitation light source and transmit the excitation light beams along the light path,
the light path being arranged so as to communicate excitation light along a first direction to a plurality of excitation mirrors, a first of the plurality of excitation mirrors being separated by a distance from a second of the plurality of excitation mirrors as measured along the first direction,
the light path being arranged to communicate excitation light along a second direction away from the plurality of excitation mirrors, the second direction being at an angle to the first direction,
the light path being arranged to communicate light along the second direction to a plurality of sample receptacles comprised in the biological analysis system, each sample receptacle being associated with a respective excitation mirror and being positioned to receive light transmitted along the second direction; and
the light path being arranged to communicate light in a third direction from a sample receptacle to a photodetector associated with that sample receptacle.

20. The biological analysis system of claim 19, further comprising a plurality of excitation lenses arranged such that each excitation lens is positioned in the second direction and is configured to focus a respective beam of light into a respective focused beam of excitation light to be received at a respective sample receptacle.

* * * * *